Figure 1:
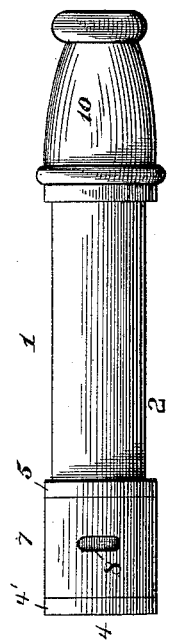

(No Model.)

R. N. WARREN & A. DOW.
INHALER.

No. 439,707. Patented Nov. 4, 1890.

Witnesses:
J. B. McGivr.
H. F. Burchard

Inventor:
Alonzo Dow and
Rolan N. Warren
By their Attorneys,
Edson Bros.

THE NORRIS PETERS CO., PHOTO-LITHO., WASHINGTON, D. C.

UNITED STATES PATENT OFFICE.

ROLAN N. WARREN AND ALONZO DOW, OF WOOSTER, OHIO; SAID WARREN ASSIGNOR TO SAID DOW.

INHALER.

SPECIFICATION forming part of Letters Patent No. 439,707, dated November 4, 1890.

Application filed March 18, 1890. Serial No. 344,366. (No model.)

*To all whom it may concern:*

Be it known that we, ROLAN N. WARREN and ALONZO DOW, citizens of the United States, of Wooster, in the county of Wayne and State of Ohio, have invented certain new and useful Improvements in Inhalers; and we do hereby declare the following to be a full, clear, and exact description of the invention, such as will enable others skilled in the art to which it appertains to make and use the same.

Our invention relates to improvements in inhalers; and the object of the invention is to provide a simple and inexpensive contrivance whereby the medicaments for the cure or treatment of headache, catarrh, and other diseases can be inhaled through the nostrils, and to enable the supply of air through the inhaler to be readily shut off, and thus obviate volatilization of the medicaments in the inhaler.

With these and other ends in view our invention consists, first, in the combination of an external tube having an air-inlet at one end and an outlet at its opposite end for the air which is charged with the medicament contained within the tube, an inner tube adapted to contain one or more of the ingredients or medicaments, and a packing arranged between the two tubes and containing one or more medicaments or ingredients of the composition for the treatment of disease. This internal tube is peforated throughout its length, and at or near its middle a transverse partition is provided to arrest the progress of air through said internal tube and to cause the air to pass into and through the absorbent material by which said internal tube is surrounded, and this packing or absorbent material terminates at a short distance from the outlet of the internal tube to permit the air to readily enter the discharge end of the tube. For the treatment of catarrh, headache, and like diseases we employ three medicaments—namely, menthol in the inner perforated tube and equal parts of chloride ammonium and carbonate of potassium—which are used in the form of dry powders and impregnate the absorbent material or packing which surrounds the internal tube; but it is evident that other substances can be used in lieu of those named herein. The air enters the inhaler through the inlet orifice at one end thereof, passes into the internal tube and the menthol therein, thence into the absorbent packing around said internal tube, and back into the opposite end of the internal tube and out through the outlet-orifice of the inhaler, the air thus becoming impregnated or saturated by the volatilization of the ingredients in the inhaler.

The invention further consists in an axially turning sleeve or band of elastic material, preferably of india-rubber, which is fitted around the outer tube at the end thereof which has the inlet-opening, and this axially-turning sleeve has an opening which, when the sleeve is properly adjusted, coincides or aligns with the inlet-orifice in the outer tube. Over the outlet or open end of the outer tube we place a removable elastic cap, which holds itself in place by its inherent elasticity on said outer tube, and within this elastic cap is arranged a hollow stopper or projection which receives the discharge end of the internal perforated tube.

Our improved inhaler is very simple in construction, can be easily manipulated for use or closed to prevent evaporation of the medicament therein, can be made and sold at a very low figure, and conveniently carried in a pocket.

To enable others to readily understand our invention, we will now proceed to a detailed description thereof in connection with the accompanying drawings, in which—

Figure 2:
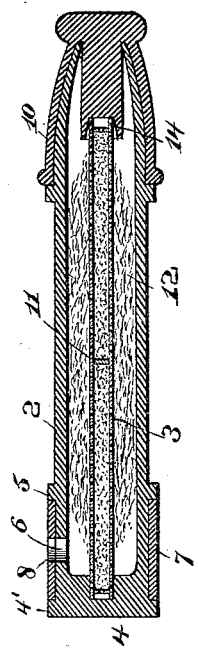
Figure 3:
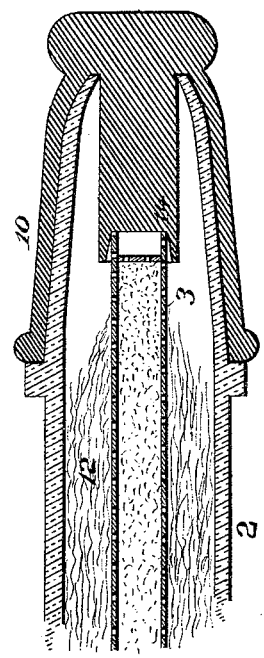

Figure 1 is an elevation of our improved inhaler. Fig. 2 is a longitudinal sectional view through the same. Fig. 3 is an enlarged sectional view through the device at the discharge end of the same.

Like numerals of reference denote corresponding parts in all the figures of the drawings, referring to which—

1 designates our improved pocket-inhaler, which has an external tube 2 and an internal tube 3, which internal tube is arranged centrally within the external tube substantially concentric therewith and extends longitudinally of the same. The external tube is preferably made of glass or a similar transparent material, and the internal tube is made of metal; but we do not confine ourselves to these particular materials, as it is obvious that others can be substituted therefor without departing from the spirit or sacrificing the advantages of our invention. The external tube is closed at one end by an integral head 4, and the opposite end of this tube is left open and is adapted to be closed by a removable elastic cap or thimble, as will be presently described. The integral head projects or extends slightly beyond the face of the external tube, so as to provide a flange 4', and the tube is provided with an annular bead or flange 5, which is situated a short distance from the bead or flange 4', and is arranged concentric with the same. Said external tube has an air-inlet orifice 6 at a point between the two concentric annular flanges 4' 5', and over this end of the tube is fitted an elastic-sleeve 7, which is confined in place on the tube by and between the annular flanges thereof. This sleeve is provided with a single aperture 8, which is adapted to coincide with the inlet-orifice 6 in the external tube, and the sleeve is adapted to be turned or rotated axially to adjust its aperture into or out of coincidence with the air-inlet orifice in the external tube, as is obvious.

The internal tube 3 is perforated throughout its entire length with apertures or holes, as shown, and one end of this tube is rigidly secured to the integral head of the external tube, while its opposite end is fitted in a hollow protuberance on the removable elastic thimble or cap 10, which cap is fitted tightly over the open end of the external tube to prevent escape and evaporation of the medicaments therein. The internal perforated tube 3 is provided with a transverse diaphragm or partition 11, which is located at or near the middle of the same, and this tube is filled with one or more ingredients of the medicament to be used for the treatment of disease. Around this internal tube and between the latter and the external tube 2 we provide an absorbent packing or filling 12, which is adapted to be impregnated or saturated with one or more ingredients of the medicament.

In the preferred embodiment of our invention, which is used for the treatment of headache, catarrh, and similar diseases, we prefer to use the following ingredients, to wit: menthol, chloride ammonium, and carbonate of potassium. The menthol is placed or packed in the internal metallic tube, and equal parts of chloride ammonium and carbonate of potassium are placed in the absorbent packing or material between the two tubes 2 3 of the inhaler. It is evident, however, that other medicaments can be used in lieu of those herein specified, and we therefore do not confine ourselves strictly to ingredients named in this specification. The packing or filling of absorbent material, which is preferably cotton, serves to protect the menthol in the internal metallic tube 3 from the action of the rays of the sun and prevent melting of the menthol should the inhaler be used in the open air.

The elastic thimble or cap 10 is proportioned to fit tightly over the open end of the outer tube 2 of the inhaler, and this thimble or cap has a protuberance 14, which is arranged centrally within the cap or thimble and is made hollow or provided with a space to receive the free end of the internal perforated tube 3, thus tightly closing said tube 3, whereby the cap effectually prevents admission of air to the open end of the internal and external tubes of the implement.

The operation of our invention will be readily understood from the foregoing description taken in connection with the drawings. The cap or thimble 10 is first removed from the tubes, the inhaler adjusted to one of the nostrils of the nose, and the sleeve turned to cause its aperture to coincide with the aperture or orifice in the external tube.

The air in the device is enhaled through the nostril, and the air is drawn into and through the inlet-orifice at one end of the external tube, through the menthol in the inner perforated tube, thence passes through the perforations in said tube into and through the absorbent packing or cotton, and thence passes out of the inhaler into the nostrils of the person using the device. The air is charged or impregnated with the medicament as it passes through the same, and thus conveys or carries the medicament to the nostrils for the treatment and cure of the disease.

Our improved inhaler is simple and durable in construction, cheap of manufacture, can be easily manipulated, and has been found to give satisfactory results in practice.

The axially-turning sleeve and the removable cap or thimble are preferably made of elastic rubber, so as to hold themselves in place on the external tube by the inherent elasticity of the rubber; but it is not essential that these parts shall be made of elastic rubber, as they can be made of hard rubber or any other suitable material. We do not therefore confine ourselves strictly to the ingredients of the medicament, nor the materials of which the inhaler is constructed, nor the exact form and proportion of parts herein shown and described as embodiments of our invention, but hold ourselves at liberty to make such changes and alterations as fairly fall within the scope of our invention.

In lieu of making the removable cap and axially-turning sleeve of elastic rubber, as herein described, said parts may be made of metal or other preferred material, which cap and sleeve can be finished in any desired manner. We therefore reserve the right to make such substitution and changes in materials.

Having thus fully described our invention, what we claim as new, and desire to secure by Letters Patent, is—

1. An inhaler, substantially as described, consisting of an imperforate outer tube having air inlet and outlet openings at the ends thereof, an inner perforated tube arranged within said imperforate tube and adapted to contain a medicament, an absorbent packing surrounding the inner perforated tube in the space between the internal and external tubes and adapted to contain a medicament, and means for closing the air inlet and outlet openings in the external tube, substantially as and for the purpose described.

2. An inhaler, substantially as described, consisting of an imperforate outer tube having air inlet and outlet openings, an internal perforated tube extending longitudinally of the outer tube and arranged concentrically within the same, an absorbent packing or filling arranged in the space between the inner and outer tubes, a removable cap for closing the outlet-opening in the outer tube, and an axially-turning sleeve adapted to close the inlet-orifice in said outer tube, substantially as and for the purpose described.

3. An inhaler consisting of an imperforate outer tube having an air-inlet orifice at one end, an internal perforated tube, a packing of absorbent material, and an axially-turning sleeve of elastic material which is fitted tightly over the external tube and provided with an aperture adapted to coincide with the air-inlet orifice in the outer tube to admit air to the inhaler, substantially as and for the purpose described.

4. An inhaler consisting of an imperforate outer tube having an air-inlet orifice and the annular concentric flanges on opposite sides of said orifice, an internal perforated tube, an absorbent packing or filling between said tubes, and an axially-turning sleeve of elastic material fitted on said external tube between the concentric flanges thereon and having an aperture for the purpose described, substantially as set forth.

5. An inhaler, substantially as described, consisting of an external imperforate tube having an air-inlet orifice at one end and open at its other end, an internal perforated tube, a packing or filling of absorbent material, and an elastic removable cap fitted over the open end of the external tube and provided with an interior hollow protuberance which is arranged centrally within the cap and receives the open end of the internal tube, substantially as described.

In testimony whereof we affix our signatures in presence of two witnesses.

ROLAN N. WARREN.
ALONZO DOW.

Witnesses:
JOHN A. DICE,
J. F. ELDER.